July 23, 1957 T. D. PELLEGRINO 2,800,545
AUTOMOBILE SIGNALLING DEVICE
Filed Dec. 2, 1954 2 Sheets-Sheet 1
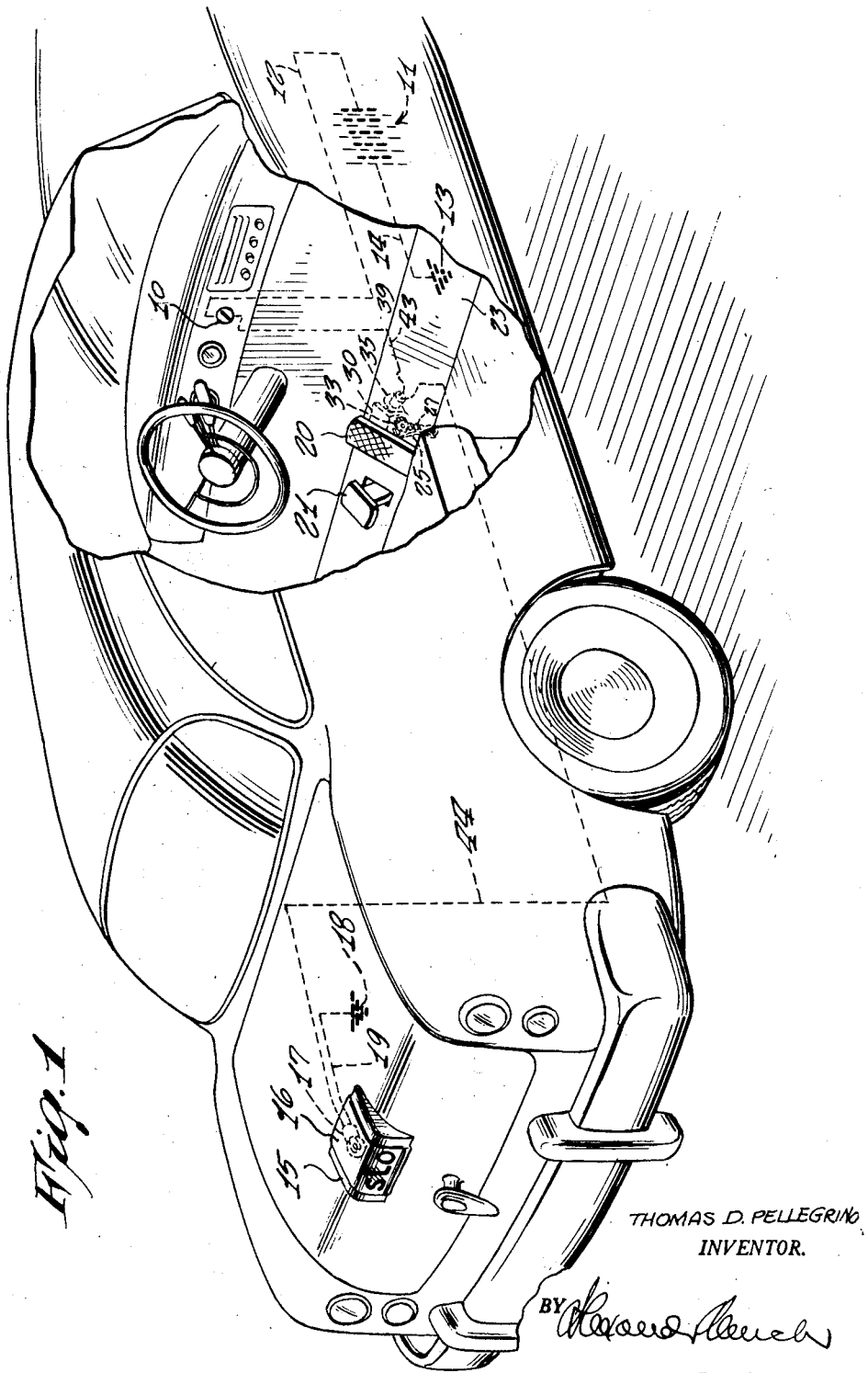
THOMAS D. PELLEGRINO
INVENTOR.
BY
ATTORNEY

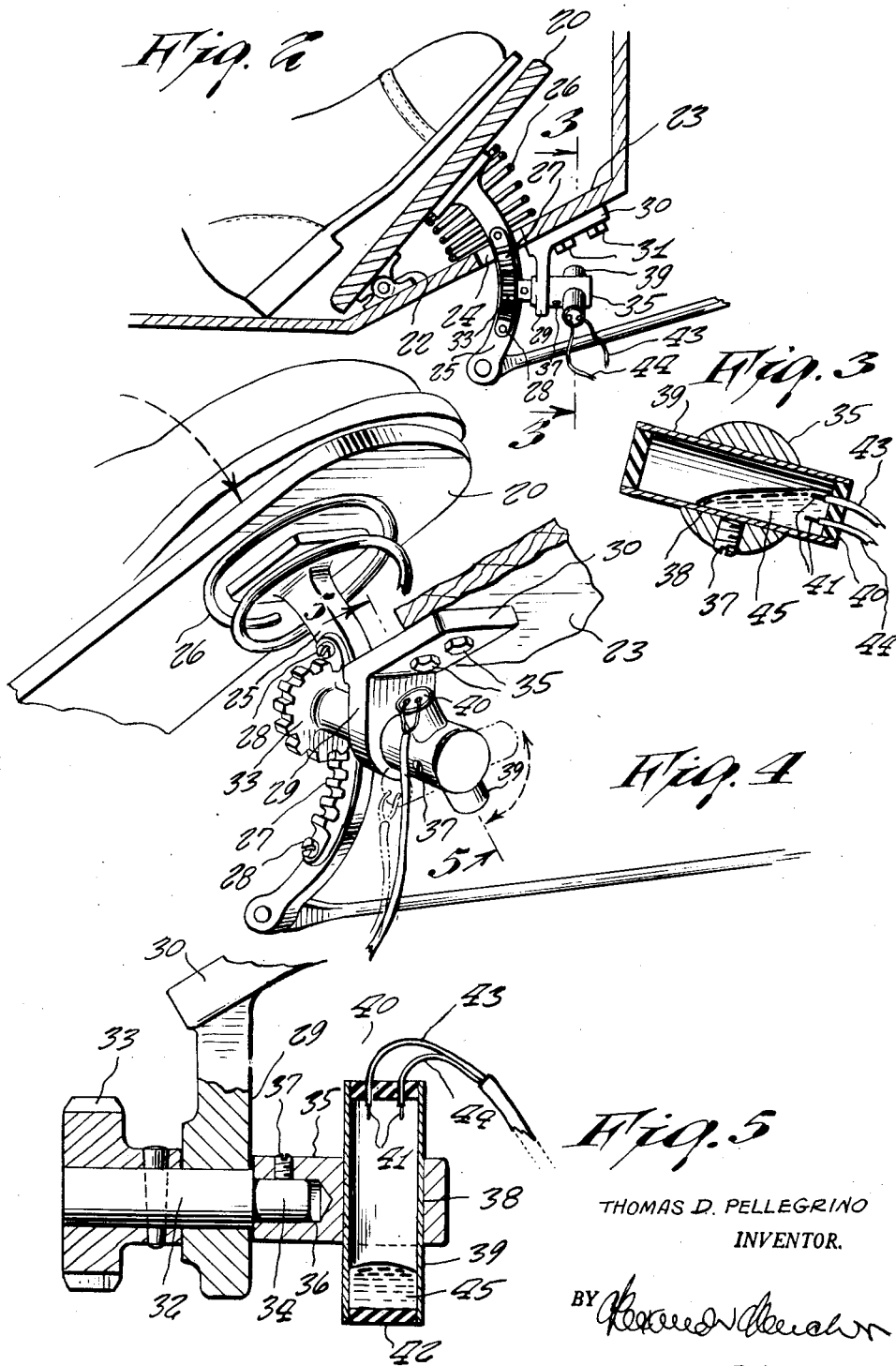

United States Patent Office 2,800,545
Patented July 23, 1957

2,800,545
AUTOMOBILE SIGNALLING DEVICE

Thomas D. Pellegrino, Floral Park, N. Y.

Application December 2, 1954, Serial No. 472,738

2 Claims. (Cl. 200—61.89)

This invention relates to signaling devices for automobiles.

It is an object of the present invention to provide a signal device for automobiles which will indicate at the rear of the car that the driver has removed his foot from the gas pedal and is about to place his foot on the brake which will advise the motorist to the rear to also remove his foot from the accelerator.

It is another object of the present invention to provide a signal device for automobiles of the above type which is inoperative when the ignition key is turned off even though the gas pedal has been released from its operative position.

Other objects of the present invention are to provide a signal device for automobiles bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view of an automobile shown partly broken away and illustrating the invention in operative use thereon;

Figure 2 is a vertical section through the floor board of a car showing a part of the invention in operative engagement with the gas pedal assembly;

Figure 3 is a vertical sectional view taken along the line 3—3 of Figure 2;

Figure 4 is a bottom perspective view of the gas pedal assembly and showing a portion of the invention mounted thereon and Figure 5 is a longitudinal sectional view taken along the line 5—5 of Figure 4.

Referring now more in detail to the drawing, and more particularly to Figure 1, 10 indicates the usual ignition switch provided on the dashboard of a car, one terminal thereof being connected to one terminal of the storage battery 11 by conductor 12, the other terminal of the battery 11 being connected to the ground 13 by conductor 14. A lamp is provided at the rear of the vehicle and includes a casing 15 having an opaque glass cover 16 which conceals an electric lamp 17 mounted therewithin. The transparent letters "SLO" or "SLOW" are provided on the vertical portion of cover 16, these letters being visible when the lamp 17 is illuminated.

One terminal of the lamp 11 is connected to ground 18 by means of a conductor 19.

As a means of illuminating the lamp 17 when the ignition switch 10 is closed and the foot of the driver is removed from the gas pedal 20 prior to application of brake 21, a novel switch arrangement is provided which will hereinafter be described in detail.

As shown in Figure 2, the usual gas pedal 20 is pivotally mounted on the undersurface thereof near its lower edge by means of the hinge 22, the floor board 23 below the gas pedal 20 being provided with an opening 24 which receives downwardly therethrough the arcuate arm 25 secured at its upper end to the undersurface of the pedal 20. A spring 26 sleeves the arm 25 intermediate the pedal 20 and floor board 23 and serves to retain the gas pedal 20 in the raised inoperative position of Figure 2.

A rake gear 27 is disposed along one side of the arm 25, being secured thereto by means of screws 28 provided at each end. A bearing bracket 29 depends in a substantially vertical direction from the undersurface of the floor board 23, being secured to the latter by means of an integrally formed flange 30 and bolts 31. A shaft 32 is rotatably mounted at its forward end within the bearing bracket 29, extending rearwardly therefrom where it fixedly mounts a gear 33 in mesh with the rake gear 27.

The forward end of the shaft 32 is integrally formed with an extension 34 of less diameter than the shaft 32 and to which is secured a cylindrical member 35 having an inwardly extending bore 36 receiving the extension 34, a set screw 37 securing the extension 34 fixedly within the bore 36. By means of the set screw 37, the member 35 may be adjusted angularly relative to the extension 34 for a purpose which will hereinafter become clear.

The forward end of the member 35 is provided with a transverse bore 38 therethrough within which is fixedly mounted the tubular casing 39 of a mercury switch, the ends of the tubular casing 39 being closed by a plastic end wall 40 which fixedly mounts the terminals 41 and at the other end by a second plastic end wall 42. Mercury 43 is sealed within the tubular casing 39 and is adapted to bridge the gap between the terminals 41 when the tubular casing is in the position of Figure 3.

One terminal 41 is connected to the other terminal of the ignition switch 10 by means of a conductor 43 while the other terminal 41 is connected to the other terminal of the lamp 17 by means of a conductor 44 whereby to complete the circuit. The adjustment of the member 35 on the extension 34 by means of the set screw 37 is such that when the gas pedal 20 is in the raised inoperative position of Figure 2, the tubular casing 39 will be disposed as shown in Figure 3 with the mercury 43 connecting the terminals 41 and thus illuminating the lamp 17. As the gas pedal 20 is depressed during the normal operation of the car, the arcuate arm 25 will move downwardly carrying with it the rake gear 27. This rotates the gear 33 and moves the tubular casing 39 into the full line position of Figure 4, in which case the mercury no longer connects the terminals 41 and the lamp 17 is not illuminated. As the motorist removes his foot from the gas pedal 20 prior to applying the brake pedal 21, the spring 26 will force the gas pedal up to its inoperative position, carrying with it the arm 25 and rake gear 27, which rotates the gear 33 and with it the tubular casing 39 to the position of Figure 3, thus illuminating the lamp 17.

While various changes may be made in the detail construction, it shall be understood that such changes shall be within the spirit and scope of the present invention as defined by the appended claims.

What is claimed is:

1. In a signal device for motor vehicles, said vehicles having an accelerator pedal above the floor board and means resiliently urging said accelerator into inoperative position, a circuit, a mercury switch below the floor board and in said circuit normally in a closed position, the combination of means inserted between said accelerator pedal and said mercury switch whereby upon a depression of the accelerator pedal, said switch will be opened, said means inserted between said switch and the accelerator pedal including a rake gear secured to the pedal assembly adjacent and extending downwardly through the floor board of the vehicle, a substantially horizontal shaft rotatably mounted below the floor board of the vehicle, a gear keyed onto said shaft in mesh with said rake gear, and means for mounting said mercury switch transversely of said shaft at the other end thereof in a plurality of angularly adjustable positions.

2. In a signal device for motor vehicles, said vehicle having an accelerator pedal above the floorboard and means resiliently urging said accelerator into inoperative position, a circuit, a mercury switch below the floor board and in said circuit normally in a closed position, the combination of means inserted between said accelerator pedal and said mercury switch whereby upon a depression of the accelerator pedal, said switch will be opened, said means inserted between said switch and the accelerator pedal including a rake gear secured to the pedal assembly adjacent and extending downwardly through the floor board of the vehicle, a substantially horizontal shaft rotatably mounted below the floor board of the vehicle, a gear keyed onto said shaft in mesh with said rake gear, and means for mounting said mercury switch transversely of said shaft at the other end thereof in a plurality of angularly adjustable positions, said last mentioned means comprising a supporting member having an inwardly extending bore at one end thereof which receives the forward end of said shaft therewithin, set screw means in said member adapted to bear on said shaft, said member having a transverse bore therethrough disposed at substantially right angles to the longitudinal axis of said shaft, said mercury switch being secured within said transverse bore.

References Cited in the file of this patent

UNITED STATES PATENTS

| | | |
|---|---|---|
| 1,873,142 | Norviel | Aug. 23, 1932 |
| 1,915,680 | Lewellen | June 27, 1933 |
| 2,275,695 | Stafford | Mar. 10, 1942 |
| 2,526,611 | Rodrick | Oct. 17, 1950 |